US009672602B2

(12) United States Patent
Hara

(10) Patent No.: US 9,672,602 B2
(45) Date of Patent: Jun. 6, 2017

(54) PROJECTION IMAGE CORRECTING APPARATUS, METHOD FOR CORRECTING IMAGE TO BE PROJECTED, AND PROGRAM

(71) Applicant: Takayuki Hara, Kanagawa (JP)

(72) Inventor: Takayuki Hara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 261 days.

(21) Appl. No.: 14/642,021

(22) Filed: Mar. 9, 2015

(65) Prior Publication Data

US 2015/0254819 A1    Sep. 10, 2015

(30) Foreign Application Priority Data

Mar. 10, 2014 (JP) ................. 2014-046340

(51) Int. Cl.
*H04N 9/31*      (2006.01)
*G06T 5/00*      (2006.01)
*G06T 7/521*     (2017.01)

(52) U.S. Cl.
CPC .............. *G06T 5/006* (2013.01); *G06T 7/521* (2017.01); *H04N 9/3185* (2013.01); *H04N 9/3194* (2013.01)

(58) Field of Classification Search
None
See application file for complete search history.

(56) References Cited

U.S. PATENT DOCUMENTS 6,416,186 B1    7/2002 Nakamura
6,846,081 B2    1/2005 Mochizuki et al.
(Continued)

FOREIGN PATENT DOCUMENTS

JP    H10-200836    7/1998
JP    3509652       3/2004
(Continued)

OTHER PUBLICATIONS

Chen, Xiaobo, et al. "Accurate calibration for a camera-projector measurement system based on structured light projection." Optics and Lasers in Engineering 47.3 (2009): 310-319.*
(Continued)

*Primary Examiner* — Zhengxi Liu
(74) *Attorney, Agent, or Firm* — Harness, Dickey & Pierce, P.L.C.

(57) ABSTRACT

A projection image correcting apparatus for correcting, according to a three-dimensional shape of a projection surface, an original image to be projected, includes a projecting unit configured to project a pattern image on the projection surface, by controlling an image projecting device; a capturing unit configured to obtain a captured image of the projection surface on which the pattern image is projected, by controlling an image capturing device; a feature point extracting unit configured to extract feature points in the captured image corresponding to feature points in the pattern image; and a three-dimensional coordinates measuring unit configured to measure, by triangulation using the extracted feature points, three-dimensional coordinates of a plurality of measuring points on the projection surface corresponding to the feature points; and a reliability calculating unit configured to calculate reliabilities of the measuring points.

9 Claims, 17 Drawing Sheets

(56) References Cited

U.S. PATENT DOCUMENTS

| | | | |
|---|---|---|---|
| 7,226,173 B2 | 6/2007 | Aoyanagi | |
| 7,857,461 B2 | 12/2010 | Kondo et al. | |
| 2002/0057832 A1* | 5/2002 | Proesmans | G01B 11/2513 382/154 |
| 2005/0254726 A1* | 11/2005 | Fuchs | H04N 5/74 382/285 |
| 2006/0158623 A1* | 7/2006 | Kobayashi | G03B 21/005 353/122 |
| 2007/0058175 A1* | 3/2007 | Maierhofer | G01B 11/002 356/601 |
| 2013/0046506 A1* | 2/2013 | Takabayashi | G06T 7/0018 702/155 |
| 2014/0247326 A1* | 9/2014 | Hebert | H04N 13/0275 348/46 |
| 2014/0267624 A1 | 9/2014 | Hara | |
| 2014/0320605 A1* | 10/2014 | Johnson | G01B 11/2513 348/47 |
| 2015/0043827 A1 | 2/2015 | Hara | |

FOREIGN PATENT DOCUMENTS

| | | |
|---|---|---|
| JP | 2004-260785 | 9/2004 |
| JP | 2005-229415 | 8/2005 |
| JP | 2010-109659 | 5/2010 |
| JP | 4507307 | 7/2010 |
| JP | 5121673 | 1/2013 |
| JP | 2015-036629 | 2/2015 |

OTHER PUBLICATIONS

Yang, Ruigang, and Greg Welch. "Automatic projector display surface estimation using every-day imagery; presented by herman towles at the 9th international conference in central europe on computer graphics, visualization and computer vision 2001." Plzen, Czech Republic (2001).*

Ouellet, Jean-Nicolas, Félix Rochette, and Patrick Hébert. "Geometric calibration of a structured light system using circular control points." 3D Data Processing, Visualization and Transmission. 2008.*

Ahmed, Atif, et al. "Geometric correction for uneven quadric projection surfaces using recursive subdivision of Bézier patches." ETRI Journal 35.6 (2013): 1115-1125.*

Yuen, Nancy PY, and William C. Thibault. "Inexpensive immersive projection." Virtual Reality Conference, 2008. VR'08. IEEE. IEEE, 2008.*

Vuylsteke, Piet, and André Oosterlinck. "Range image acquisition with a single binary-encoded light pattern." IEEE Transactions on Pattern Analysis and Machine Intelligence 12.2 (1990): 148-164.*

Raskar, Ramesh, et al. "The office of the future: A unified approach to image-based modeling and spatially immersive displays." Proceedings of the 25th annual conference on Computer graphics and interactive techniques. ACM, 1998.*

* cited by examiner

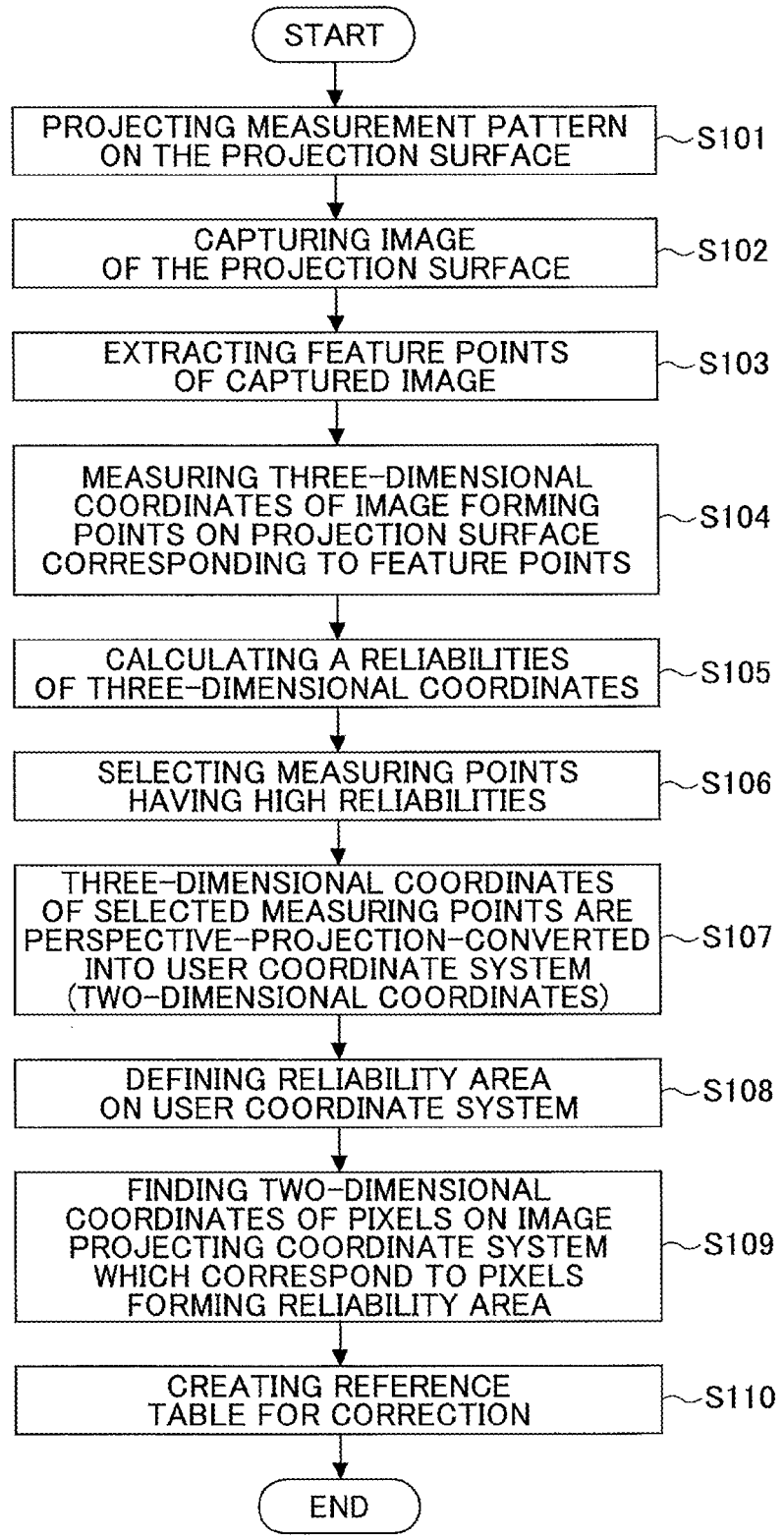

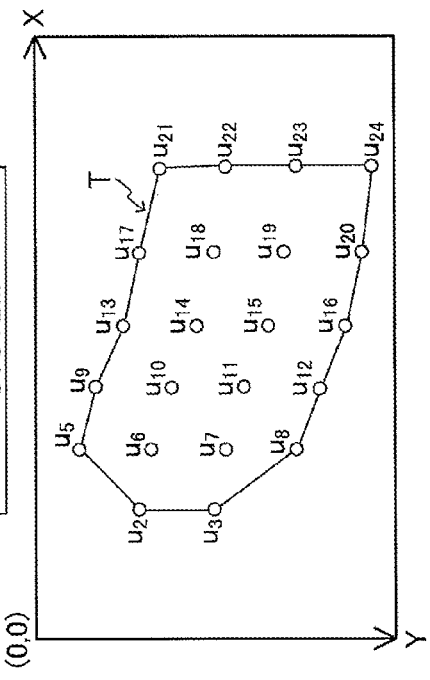
FIG.10A
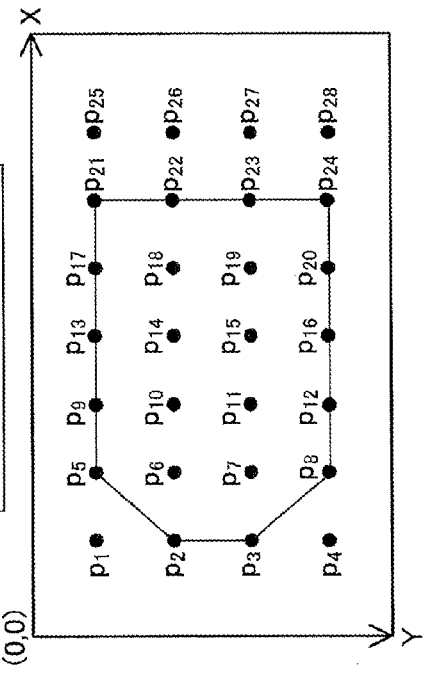
FIG.10B
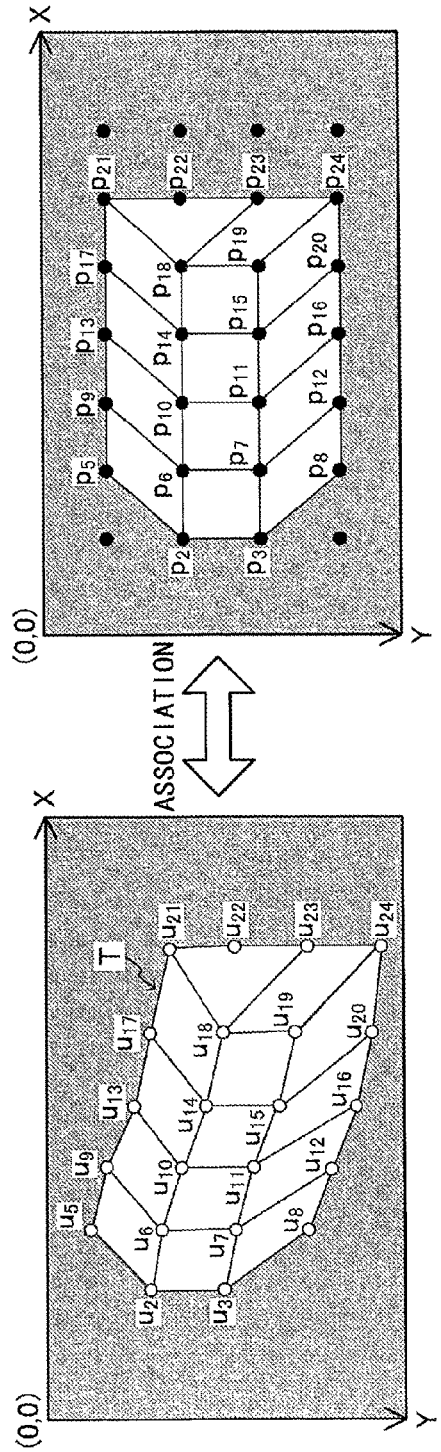

FIG.12

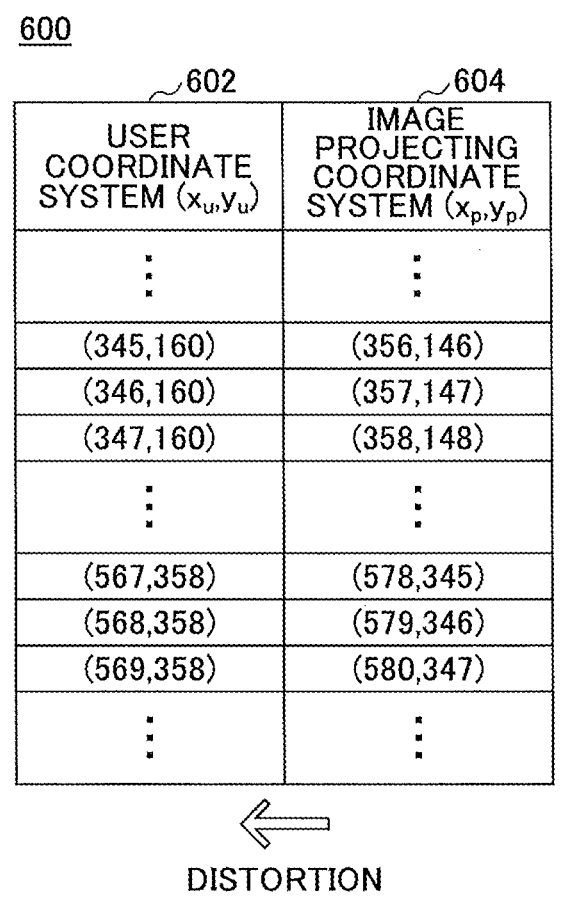

| USER COORDINATE SYSTEM $(x_u, y_u)$ | IMAGE PROJECTING COORDINATE SYSTEM $(x_p, y_p)$ |
|---|---|
| ⋮ | ⋮ |
| (345,160) | (356,146) |
| (346,160) | (357,147) |
| (347,160) | (358,148) |
| ⋮ | ⋮ |
| (567,358) | (578,345) |
| (568,358) | (579,346) |
| (569,358) | (580,347) |
| ⋮ | ⋮ |

⇐ DISTORTION

PROJECTION IMAGE CORRECTING APPARATUS, METHOD FOR CORRECTING IMAGE TO BE PROJECTED, AND PROGRAM

BACKGROUND OF THE INVENTION

1. Field of the Invention

The present technology relates to a projection image correcting apparatus.

2. Description of the Related Art

When projecting an image from a projector, in a case where a projection surface is inclined or non-planar, the projection image is distorted. To solve this problem, a method for reducing the distortion of the image, in which an inverted distortion is given to the original image to be projected so as to cancel the distortion in the projection image, is proposed (for example, Japanese Laid-open Patent Publication No. 2010-109659, or Japanese Patent Gazette No. 5121673).

In the above mentioned method, a three-dimensional shape of the projection surface is measured in advance, and an amount of distortion is calculated based on the measured three-dimensional shape, thereby correcting the original image based on the calculated amount of distortion. Therefore, in the method, precision of the correction of the distortion depends primarily on precision of the three-dimensional measurement.

RELATED ART DOCUMENT

Patent Document

[Patent Document 1]: Japanese Laid-open Patent Publication No. 2010-109659
[Patent Document 2]: Japanese Patent Gazette No. 5121673

SUMMARY OF THE INVENTION

An object of disclosure of the present technology is to provide a projection image correcting apparatus, a method for correcting an image to be projected, and a program capable of minimizing the distortion of the projection image.

The following configuration is adopted to achieve the aforementioned object.

In one aspect of the embodiment, a projection image correcting apparatus for correcting, according to a three-dimensional shape of a projection surface, an original image to be projected, includes a projecting unit configured to project a pattern image on the projection surface, by controlling an image projecting device; a capturing unit configured to obtain a captured image of the projection surface on which the pattern image is projected, by controlling an image capturing device; a feature point extracting unit configured to extract feature points in the captured image corresponding to feature points in the pattern image; a three-dimensional coordinates measuring unit configured to measure, by triangulation using the extracted feature points, three-dimensional coordinates of a plurality of measuring points on the projection surface corresponding to the feature points; a reliability calculating unit configured to calculate reliabilities of the measuring points; a reliability area defining unit configured to convert the three dimensional coordinates of the measuring points into two-dimensional coordinates as defined in a view from an arbitrary viewpoint and define a reliability area including the converted measuring points that respectively have the reliabilities exceeding a certain threshold; a reference table creating unit configured to create a reference table in which a distortion of a projection image viewed from the arbitral viewpoint is expressed by association of the two-dimensional coordinates on the reliability area with two-dimensional coordinates on an image projecting coordinate system; and an image correcting unit configured to correct the original image so that a distortion for offsetting the distortion expressed in the reference table is given to the original image, wherein the reliabilities are defined based on at least one of lens aberration and detection errors of the feature points.

Other objects, features and advantages of the present invention will become more apparent from the following detailed description when read in conjunction with the accompanying drawings.

BRIEF DESCRIPTION OF THE DRAWINGS

FIG. 2 is a flowchart illustrating a process performed by the projection image correcting apparatus;

FIG. 10A is another schematic diagram illustrating a process for creating the reference table for correction;

FIG. 10B is another schematic diagram illustrating a process for creating the reference table for correction;

FIG. 12 is an illustration diagram showing an example of a reference table;

DETAILED DESCRIPTION OF THE PREFERRED EMBODIMENTS

Figure 1:
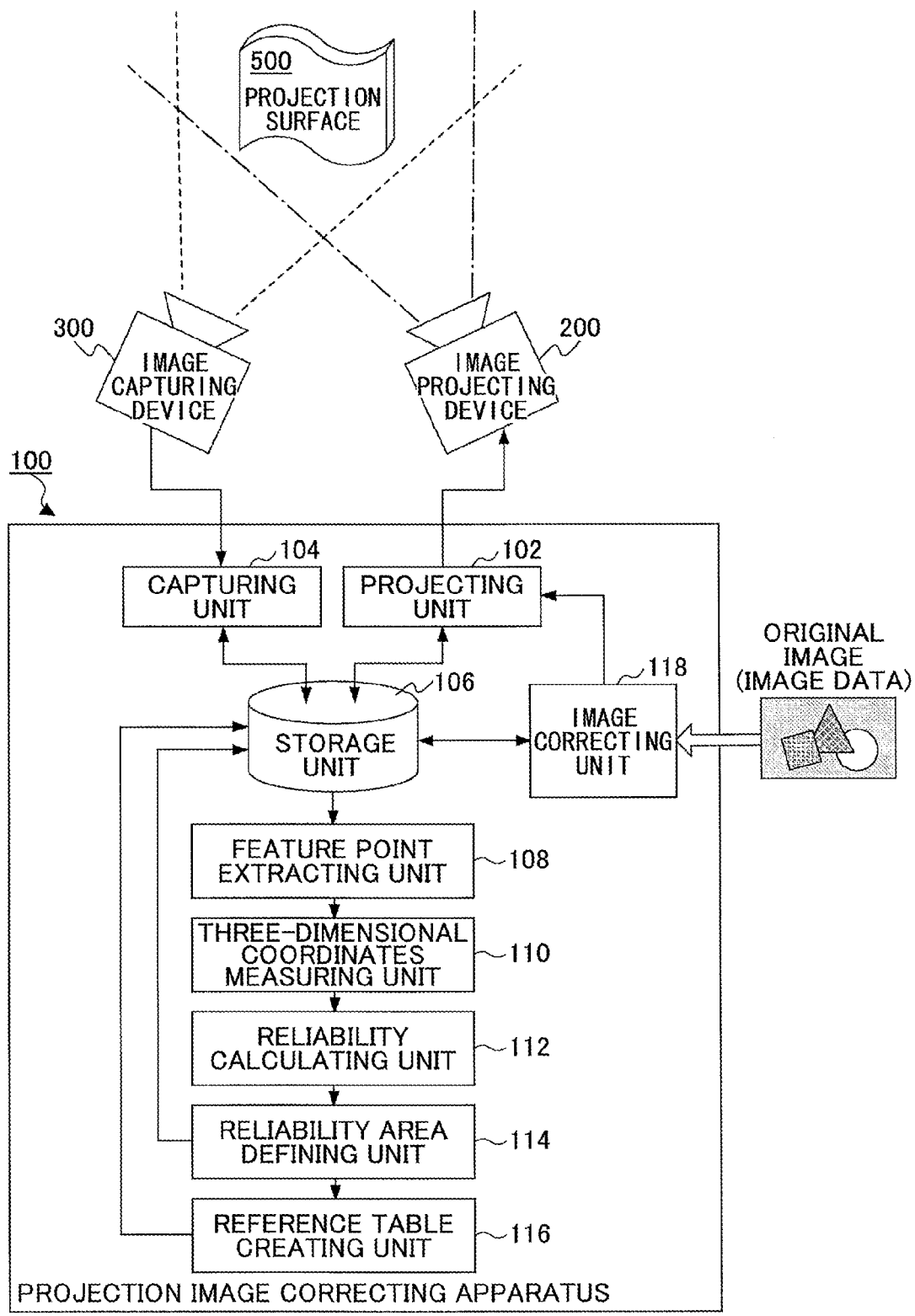
FIG. 1 is a block diagram illustrating a functional configuration of a projection image correcting apparatus of the present embodiment.

Herein below, embodiments will be described with reference to accompanying drawings. However, the embodiments described below are non-limiting examples. Additionally, in the present specification and drawings, an identical reference numeral will be applied to elements or the like that have identical functions and configurations, and descriptions thereof may be omitted.

FIG. 1 is a block diagram illustrating a functional configuration of a projection image correcting apparatus 100 of the present embodiment. The projection image correcting apparatus 100 of the present embodiment may be configured as an information processing apparatus which is connected with and capable of communicating with both an image projecting device 200 and an image capturing device 300. Additionally, in use, the image projecting device 200 and the image capturing device 300 are disposed with their relative position and direction fixed.

In the present embodiment, the image projecting device 200 may be configured as, for example, a projector or a laser projector including liquid crystal elements or DMD semiconductor elements. Also, the image capturing device may be configured as, for example, a digital camera including imaging elements such as a CCD or a CMOS image sensor.

The projection image correcting apparatus 100 of the present embodiment is configured to include a projecting unit 102, a capturing unit 104, a feature point extracting unit 108, a three-dimensional coordinates measuring unit 110, a reliability calculating unit 112, a reliability area defining unit 114, a reference table creating unit 116, an image correcting unit 118 and storage unit 106 that is configured with a semiconductor storage device (RAM/ROM), a hard disk drive, an optical disk, or the like.

The projecting unit 102 is a functional unit for controlling the image projecting device 200 to project an image on a projection surface 500. The capturing unit 104 is a functional unit for controlling the image capturing device 300 to capture an image of the projection surface 500.

The feature point extracting unit 108 is a functional unit for extracting feature points corresponding to each other between a captured image of a certain measurement pattern to be projected by the image projecting device 200 and a captured image of the certain measurement pattern projected on the projection surface 500.

The three-dimensional coordinates measuring unit 110 is a functional unit for measuring three-dimensional coordinates of image forming points on the projection surface 500 corresponding to the extracted feature points. The reliability calculating unit 112 is a functional unit for calculating reliabilities (described later) of the measured three-dimensional coordinates.

The reliability area defining unit 114 is a functional unit for defining a reliability area based on the calculated reliabilities. The reference table creating unit 116 is a functional unit for creating a reference table for correction based on the defined reliability area.

The image correcting unit 118 is a functional unit for correcting an original image (image data) based on the created reference table so as to minimize distortion of the projected image in arbitral viewpoints.

Hereinabove, respective functional units of the projection image correcting apparatus 100 of the present embodiment are described. Next, a process performed by the projection image correcting apparatus 100 will be described with reference to FIG. 2. FIG. 2 is a flowchart illustrating a process performed by the projection image correcting apparatus. Additionally, in the following description, FIG. 1 will be referred to as needed.

Figure 3A:
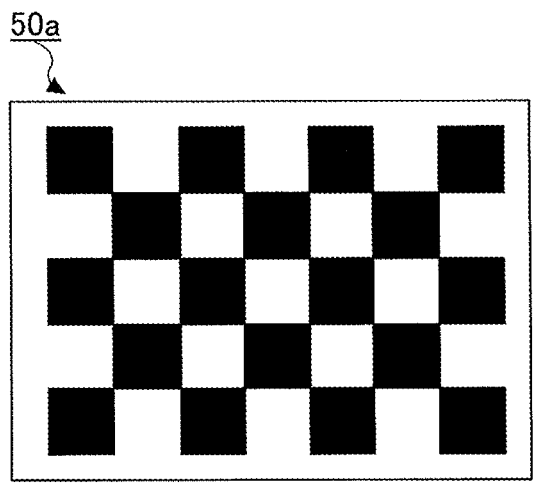
FIG. 3A is an illustration diagram of an example of the measurement patterns used in the present embodiment.
Figure 3B:
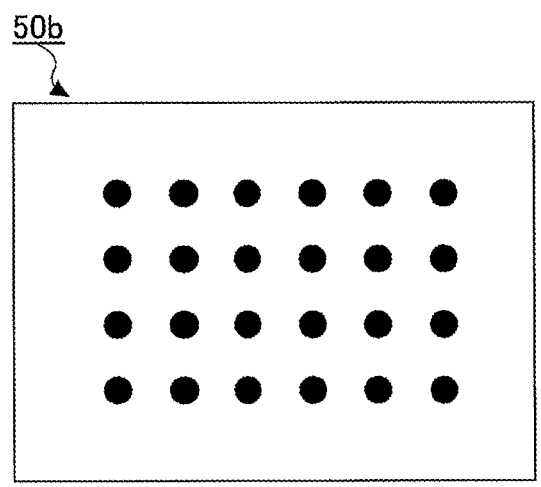
FIG. 3B is an illustration diagram of another example of the measurement patterns used in the present embodiment.

In step S101, the projecting unit 102 retrieves a measurement pattern from the storage unit 106, and controls the image projecting device 200 to project the measurement pattern on the projection surface 500. FIG. 3A is an illustration diagram of an example of the measurement patterns used in the present embodiment. FIG. 3B is an illustration diagram of another example of the measurement patterns used in the present embodiment. Additionally, the measurement patterns are not limited to those shown in FIG. 3A and FIG. 3B, but may be any patterns from which the feature points can be extracted.

In step S102, the capturing unit 104 controls the image capturing device 300 to capture the image of the projection surface 500. At this time, the capturing unit 104 receives the captured image of the projection surface 500 on which the image of the measurement pattern is projected.

In step S103, the feature point extracting unit 108 retrieves the captured image of the projection surface 500 having been stored in the storage unit 106 to analyze it, thereby extracting the feature points. Specifically, the feature point extracting unit 108 extracts the feature points of the captured image based on a rule, and obtains two-dimensional coordinates of the feature points on the captured image plane. For example, in a case where a checkered pattern 50a shown in FIG. 3A is used as the measurement pattern, corners of quadrates (white or black) in the projection image of the checkered pattern 50a are extracted as the feature points, using Harris Corner Detection Algorithm, etc., and thereby obtaining the two-dimensional coordinates. Also, in a case where a dotted pattern 50b shown in FIG. 3B is used as the measurement pattern, center points of the dots are extracted as the feature points, and thereby obtaining the two-dimensional coordinates.

Figure 4:
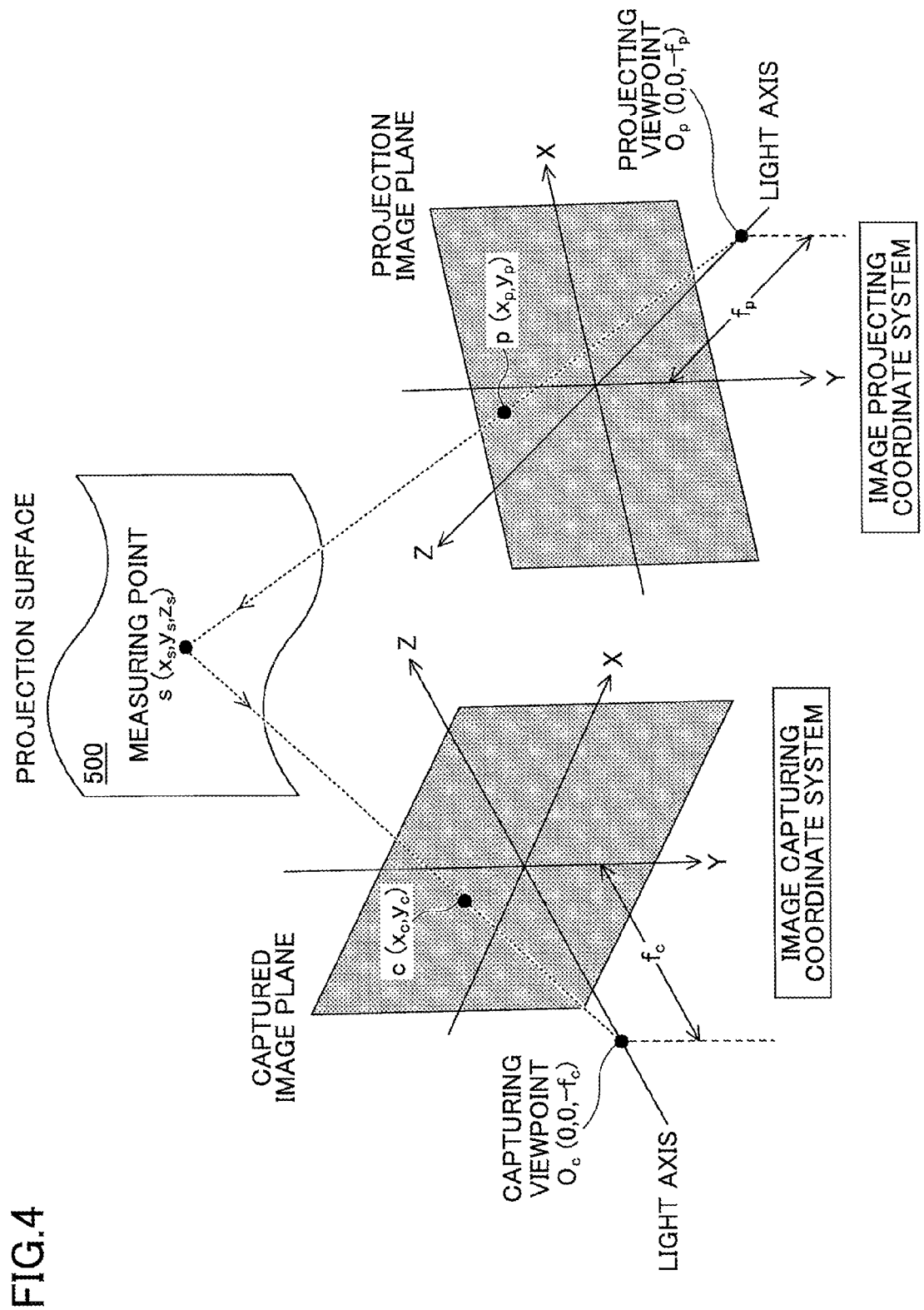
FIG. 4 is a schematic diagram illustrating principles of the three-dimensional measurement.

In step S104, the three-dimensional coordinates measuring unit 110 finds the three-dimensional coordinates of the image forming points on the projection surface 500 corresponding to the extracted feature points, based on principles of triangulation. In the following detailed description on how the three-dimensional coordinates of the image forming points on the projection surface 500 corresponding to the extracted feature points are found will be given, with reference to FIG. 4. FIG. 4 is a schematic diagram illustrating principles of the three-dimensional measurement.

As shown in FIG. 4, when an optical system of the image projecting device 200 and the image capturing device 300 are approximated by a pinhole camera model, position coordinates of a projecting viewpoint $O_p$ and capturing viewpoint $O_c$ are respectively expressed as $(0, 0, -f_p)$, and $(0, 0, -f_c)$ where a focal length of the optical system of the image projecting device 200 is $f_p$ and a focal length of the optical system of the image capturing device 300 is $f_c$. Here, a light beam for projecting the measurement pattern, output from the projecting viewpoint $O_p$, forms an image at an image forming point "s", passing through a pixel "p" ($X_p$, $Y_p$) on the projection image plane. Meanwhile, a light beam reflected from the image forming point "s" is focused at the capturing viewpoint $O_c$, having passed through a pixel "c" ($X_c$, $Y_c$) on the captured image plane.

Here the pixel "c" is considered to be an extracted feature point. The three dimensional coordinates of the image forming point "s" corresponding to the feature point are found as $(x_s, y_s, z_s)$ on the projection surface 500 according to the principles of triangulation, where the principles of triangulation are applied to a feature point (the pixel) "p" $(x_p, y_p, 0)$ on the projection image plane corresponding to the feature point "c", the projecting viewpoint $O_p$ $(0, 0, -f_p)$, the capturing viewpoint $O_c$ $(0, 0, -f_c)$, internal parameters (focal length, positions of light axes, lens distortion, etc.) and external parameters (relative positions and directions of the image projecting device 200 and the image capturing device 300) of two camera coordinate systems (image projecting coordinate system and image capturing coordinate system) given in advance. Hereinafter, the image forming point "s" is referred to as a measuring point "s".

The three-dimensional coordinates measuring unit 110 finds the three-dimensional coordinates of n measuring point ($s_1$, $s_2$, $s_3$, . . . $s_n$) on the projection surface 500 corresponding to n feature points extracted by the feature extracting unit 108, in accordance with the process described above.

However, practically, a straight line passing through the projecting viewpoint $O_p$ and the feature point "p", and a straight line passing through the capturing viewpoint $O_c$ and a capturing point (the pixel) "c" may never intersect with each other. In this case, the three-dimensional coordinates measuring unit 110 estimates the three-dimensional coordinates of the measuring point "s" on the projection surface 500, in accordance with the midpoint method or the method based on Reprojection Error Minimization.

Figure 5:
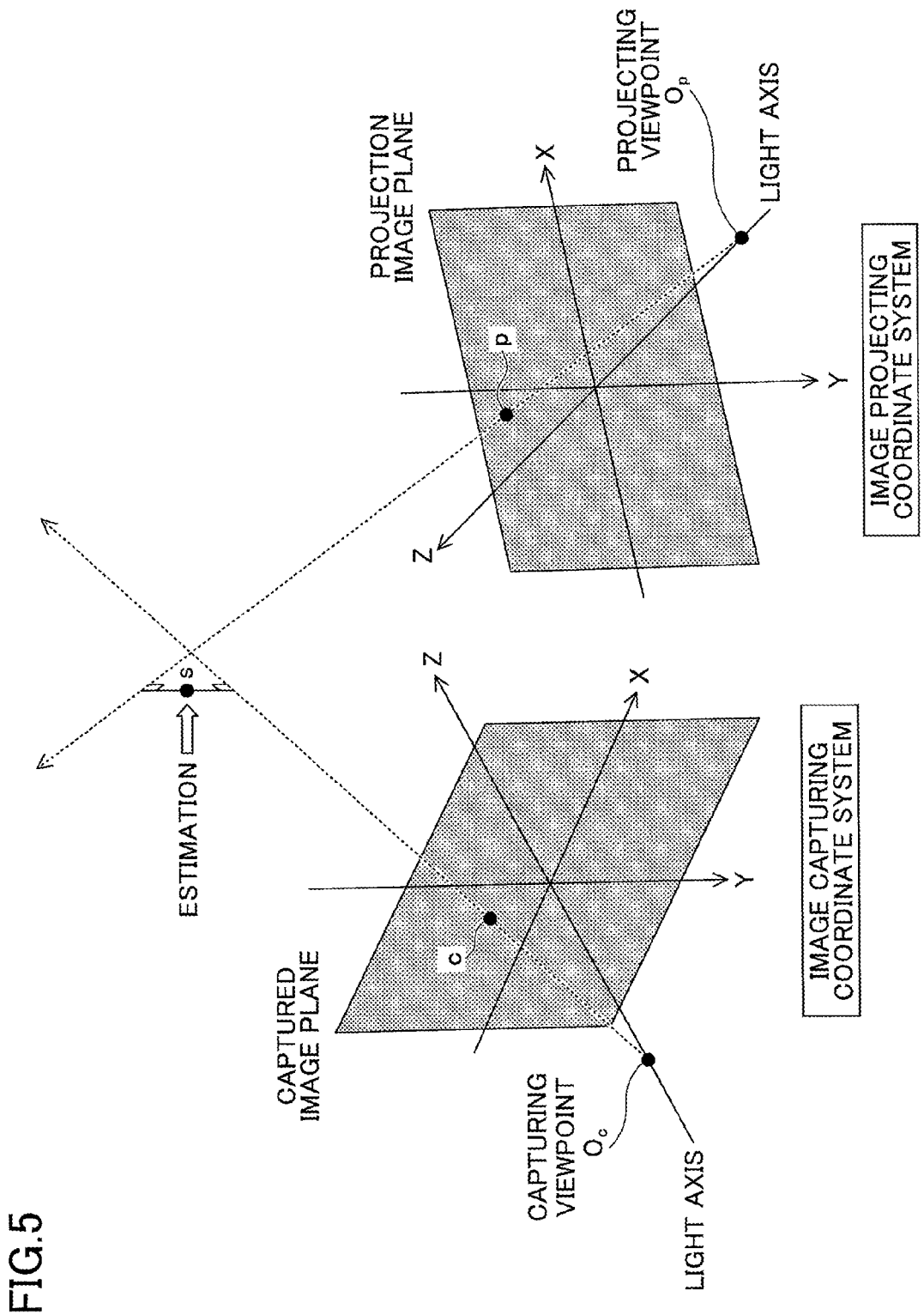
FIG. 5 is a schematic diagram illustrating the midpoint method.
Figure 6:
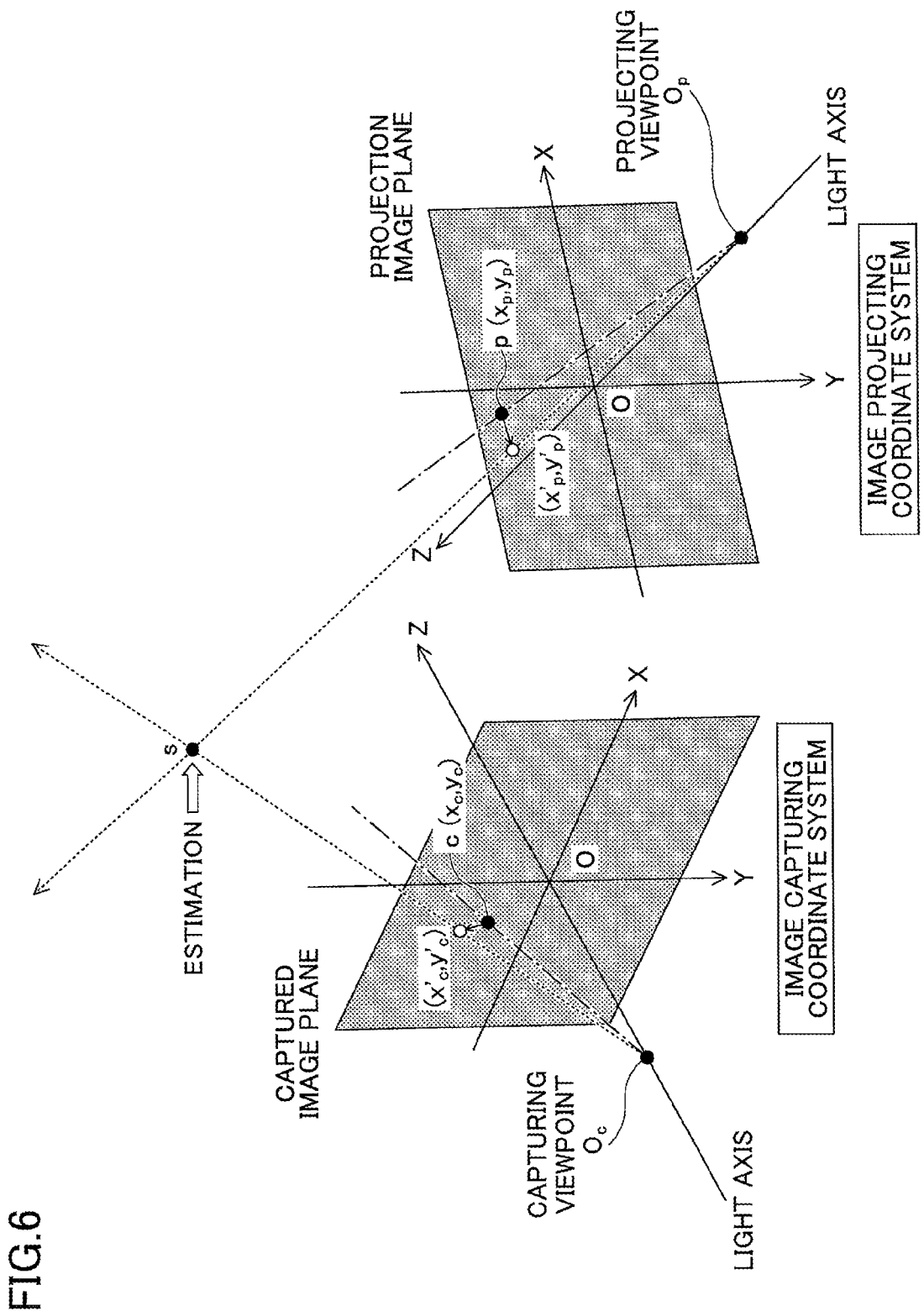
FIG. 6 is a schematic diagram illustrating the method based on Reprojection Error Minimization.

FIG. 5 is a schematic diagram illustrating the midpoint method. In the midpoint method, as shown in FIG. 5, three-dimensional coordinates of a midpoint of a straight line, which connects a line of projecting sight and a line of capturing sight at the shortest distance, are estimated as the three-dimensional coordinates of the measuring point "s" on the projection surface 500. FIG. 6 is a schematic diagram illustrating the method based on Reprojection Error Minimization. In the method based on Reprojection Error Minimization, as shown in FIG. 6, lines of sight in both optical systems are redefined, by moving the feature point ($x_p$, $y_p$) to a point ($x'_p$, $y'_p$) with the minimum moving amount on the projection image plane, and moving the feature point ($x_c$, $y_c$) to a point ($x'_c$, $y'_c$) with the minimum moving amount on the captured image plane. Hereinafter, processes of moving the feature points on the projection image/captured image and redefining the lines of projecting sight/capturing sight are repeatedly performed so as to minimize a distance between the redefined line of projecting sight and the redefined line of capturing sight (reprojection error) by using non-linear programming, or the like, thereby estimating three-dimensional coordinates of a point, at which the line of projecting sight and the line of capturing sight intersect each other, as the three-dimensional coordinates of the measuring point "s" on the projection surface 500.

The description is continued with reference to FIG. 2. In step S105, the reliability calculating unit 112 calculates reliability of the three-dimensional coordinates measured by the three-dimensional coordinates measuring unit 110. Here, the reliability means an index for expressing a likelihood of the measured three-dimensional coordinates. In the present embodiment, the reliability is defined based on at least one of lens aberration and detection errors of the feature points.

Figure 7:
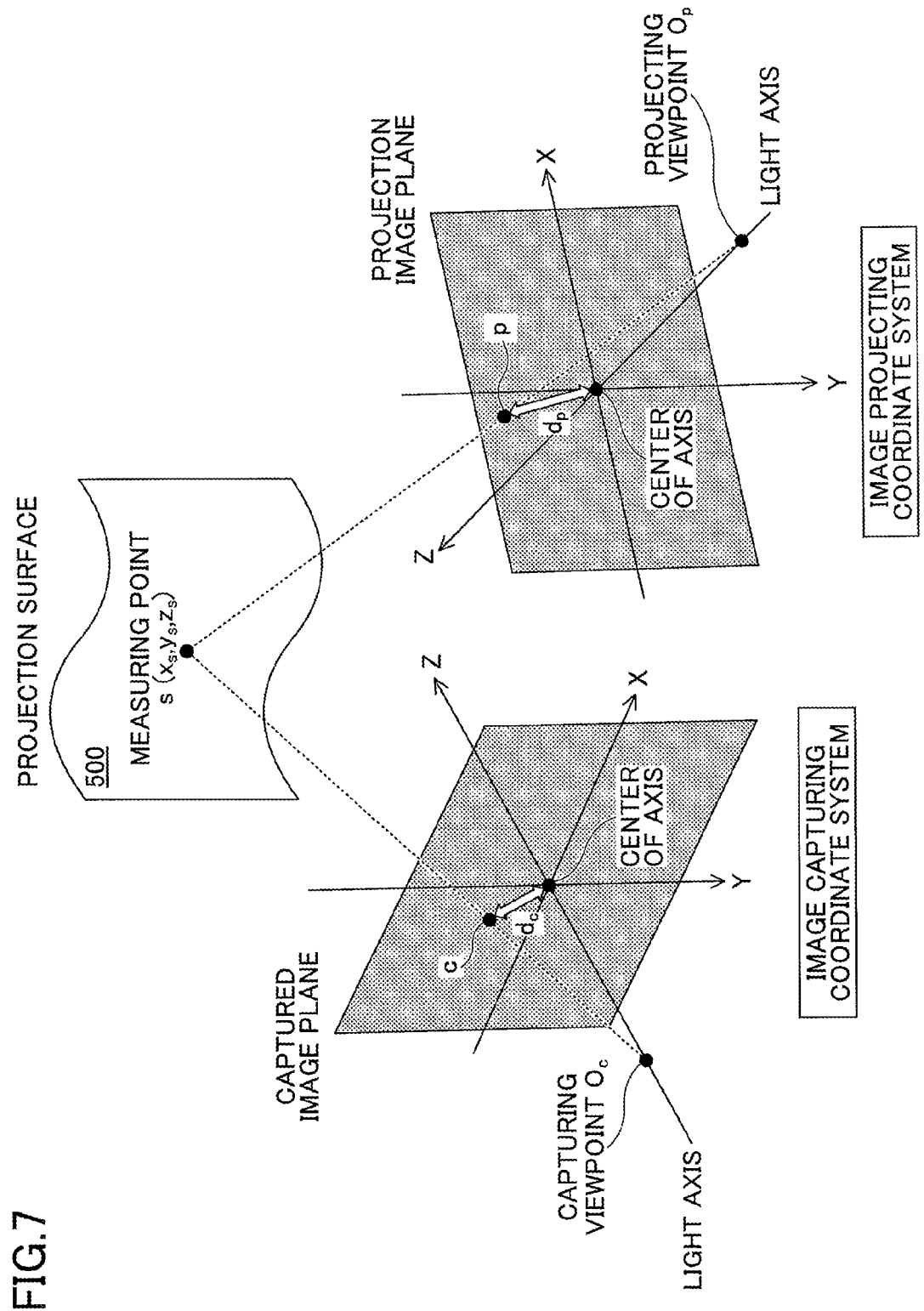
FIG. 7 is a schematic diagram illustrating the reliability defined based on the lens aberration.

First, the reliability defined based on the lens aberration is described with respect to FIG. 7. FIG. 7 is a schematic diagram illustrating the reliability defined based on the lens aberration. The lens aberration is one of the causes of deterioration of accuracy in three-dimensional coordinate measurement. Generally, it is known that the lens aberration become greater when a passing point of a light beam departs more from an axis of the lens. Considering this, in the present embodiment, the reliability is expressed by formula (1).

[Formula (1)]

$$\text{RELIABILITY} = 1/d_c + 1/d_p \quad (1)$$

In formula (1), "$d_c$" is a distance between the feature point "c" corresponding to the measuring point "s" on the projection surface and the center of the axis of the light beam on the captured image plane, and "$d_p$" is a distance between the feature point "p" corresponding to the measuring point "s" and the center of the axis of the light beam on the projection image plane.

In this case, the reliability calculating unit 112 finds the "$d_c$" and the "$d_p$" corresponding to the measuring point "s" measured in step S104, and substitutes them into formula (1), thereby calculating the reliability of the three-dimensional coordinates ($x_i$, $y_i$, $z_i$) of the measuring point "s". Additionally, as formula (1) is an example formula, in the present embodiment, an appropriate function may be defined so as to find a value that becomes smaller when at least one of the lens aberration of an image capturing light beam passing through the feature point "c" and the lens aberration of image projecting light beam passing through the feature point "p" becomes greater.

Next, the reliability defined based on the detection errors of the feature points is described. The detection error caused by hardware or software, when the feature point (pixel) is detected, is another cause of deterioration of accuracy in three-dimensional coordinate measurement. It is already described that the three-dimensional coordinates are estimated by using the midpoint method or the method based on Reprojection Error Minimization in a case where the point of intersection between the line of projecting sight and the line of capturing sight cannot be found due to the detection errors. Considering this, in the present embodiment, a reliability function is defined as follows.

In a case where the three-dimensional coordinates are estimated by the midpoint method, a reliability function for finding a value, which becomes smaller when a minimum distance L (see FIG. 5) between the line of projecting sight and the line of capturing sight becomes greater, is defined in advance, and the minimum distance L used in the estimation of the three-dimensional coordinates is substituted into the reliability function, thereby calculating the reliability of the three-dimensional coordinates.

In a case where the three-dimensional coordinates are estimated by the method based on Reprojection Error Minimization, a reliability function for finding a value, which becomes smaller when the reprojection error becomes greater is defined in advance, and the reprojection error (total) in the estimation of the three-dimensional coordinates is substituted into the reliability function, thereby calculating the reliability of the three-dimensional coordinates.

Additionally, in the present embodiment, with respect to each measuring point "s", the reliability may be calculated as one of the reliability defined based on the lens aberration (hereinafter referred to a first reliability) and the reliability defined based on the detection errors (hereinafter referred to a second reliability), or may be calculated as a third reliability which is calculated by substituting the first reliability and the second reliability into another reliability function, where the other reliability function, using the first reliability and the second reliability as variables for finding a value which becomes greater when the variables becomes greater, is defined in advance.

The description is continued with reference to FIG. 2. After calculating the reliability in step S105, the reliability area defining unit 114 defines a reliability area based on the calculated reliability, in a manner described below.

Figure 8:
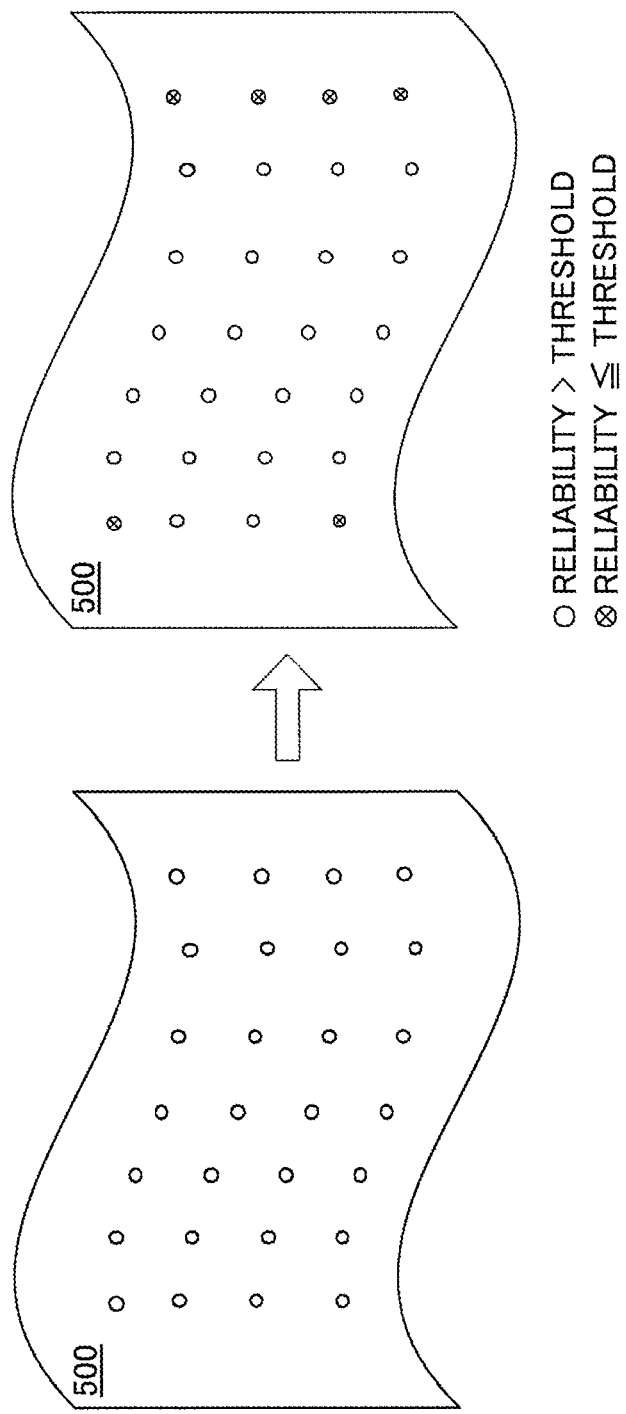
FIG. 8 is a schematic diagram illustrating a process for creating the reference table for correction.

FIG. 8 is a schematic diagram illustrating this process. As shown in FIG. 8, the reliability area defining unit 114 selects m measuring points "s", having the reliabilities of the three-dimensional coordinates exceeding a certain threshold, among n measuring points "s" on the projection surface 500 (step S106).

Figure 9:
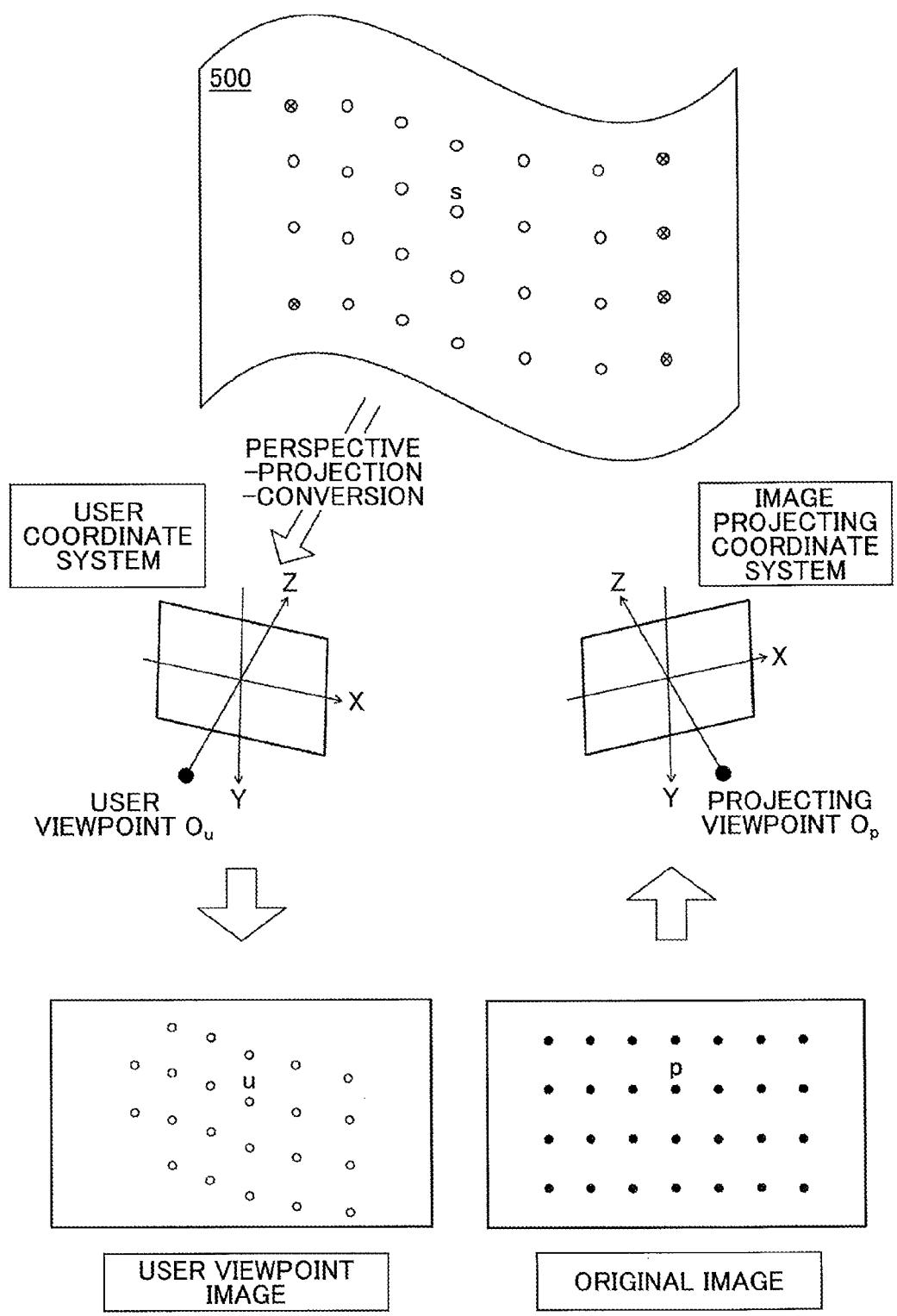
FIG. 9 is another schematic diagram illustrating a process for creating the reference table for correction.

FIG. 9 is another schematic diagram illustrating this process. As shown in FIG. 9, the reliability area defining unit 114 converts the three-dimensional coordinates of the selected m measuring points "s" into two-dimensional coordinates on an image capturing coordinate system (hereinafter referred to as a user coordinate system) whose image capturing viewpoint is an arbitrary user view point $O_m$ (step S107). Specifically, the three-dimensional coordinates of the m measuring points "s" ($s_1$, $s_2$, $s_3$, . . . $s_m$) are perspective-projection-converted into two-dimensional coordinates of m feature points "u" ($u_1$, $u_2$, $u_3$, . . . $u_m$) on the user coordinate system.

FIG. 10A is another schematic diagram illustrating this process. FIG. 10B is another schematic diagram illustrating this process. As shown in FIG. 10A, the reliability area defining unit 114 defines a polygonal area as a reliability area T, where feature points "u" among m feature points "u" form apexes of the polygon and all of the m feature points "u" are included in the polygonal area (step S108). Additionally, the reliability area defining unit 114 stores the defined reliability area T (coordinate information for defining the area) in the storage unit 106.

Then, the reference table creating unit 116 creates the reference table for correction based on the defined reliability area T, in a manner described below. First, the reference table creating unit 116 finds two-dimensional coordinates of pixels on the image projecting coordinate system, which correspond to pixels forming the reliability area T on the user coordinate system (step S109).

Specifically, as shown in FIG. 10B, the reliability area T is divided into quadrangular areas, whose apexes are respectively formed by the feature points "u". The two-dimensional coordinates of pixels "p" on the image projecting coordinate system corresponding to the feature points "u" forming the respective axes of the quadrangular areas are known. Therefore, the two-dimensional coordinates of other pixels are interpolated based on the four known two-dimensional coordinates.

Figure 11:
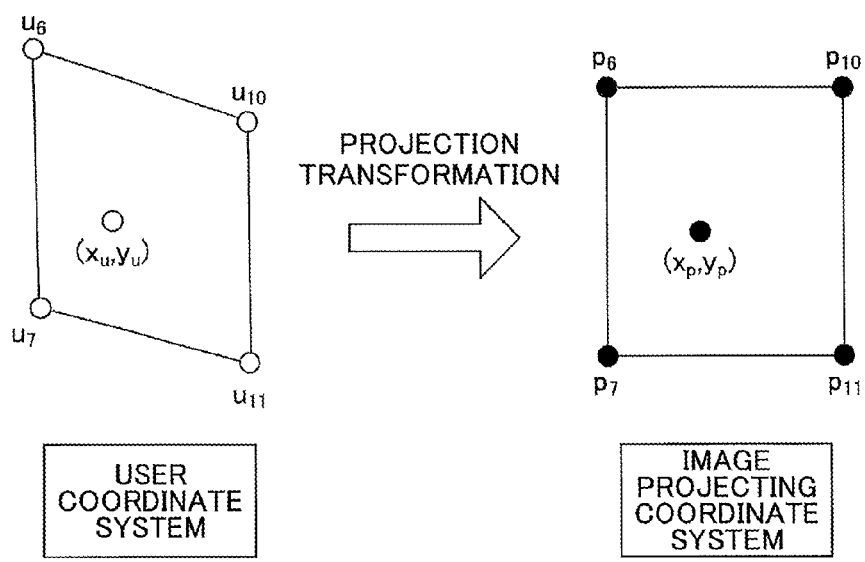
FIG. 11 is another schematic diagram illustrating a process for creating the reference table for correction.

FIG. 11 is another schematic diagram illustrating this process. As shown in FIG. 11, for example, in a case where four pixels "u" ($u_6$, $u_7$, $u_{10}$, $u_{11}$) on the user coordinate system respectively correspond to four pixels "p" ($p_6$, $p_7$, $p_{10}$, $p_{11}$) on the image projecting coordinate system, position coordinates ($x_p$, $y_p$) of a pixel on the image projecting coordinate system, corresponding to position coordinates of a pixel included in the quadrangular area having the four pixels "u" ($u_6$, $u_7$, $u_{10}$, $u_{11}$) as its apexes, are found by a projection transformation function shown as formula (2), wherein parameter "h" in formula (2) is found based on the four known position coordinates.

[Formula (2)]

$$\begin{pmatrix} x_p \\ y_p \end{pmatrix} = \frac{1}{h_{31}x_u + h_{32}y_u + h_{33}} \begin{pmatrix} h_{11}x_u + h_{12}y_u + h_{13} \\ h_{21}x_u + h_{22}y_u + h_{23} \end{pmatrix} \quad (2)$$

Then, the reference table creating unit 116 associates the two-dimensional coordinates on the image projecting coordinate system found in step S109 with the two-dimensional coordinates of the reliability area T, thereby creating the reference table for correction (step S110).

FIG. 12 is an illustration diagram showing an example of a reference table 600 created through the process described above. As shown in FIG. 12, in the reference table 600, the two-dimensional coordinates of the pixels that form the reliability area T on the user coordinate system, are stored in a field 602, while the two-dimensional coordinates of the corresponding pixels on the image projecting coordinate system are stored in a field 604, thereby being associated with each other to express the distortion of the projection image from an arbitral viewpoint by association of the two-dimensional coordinates on the reliability area T with the two-dimensional coordinates on the image projecting coordinate system. Additionally, the reference table creating unit 116 stores the created reference table 600 in the storage unit 106.

Figure 13:
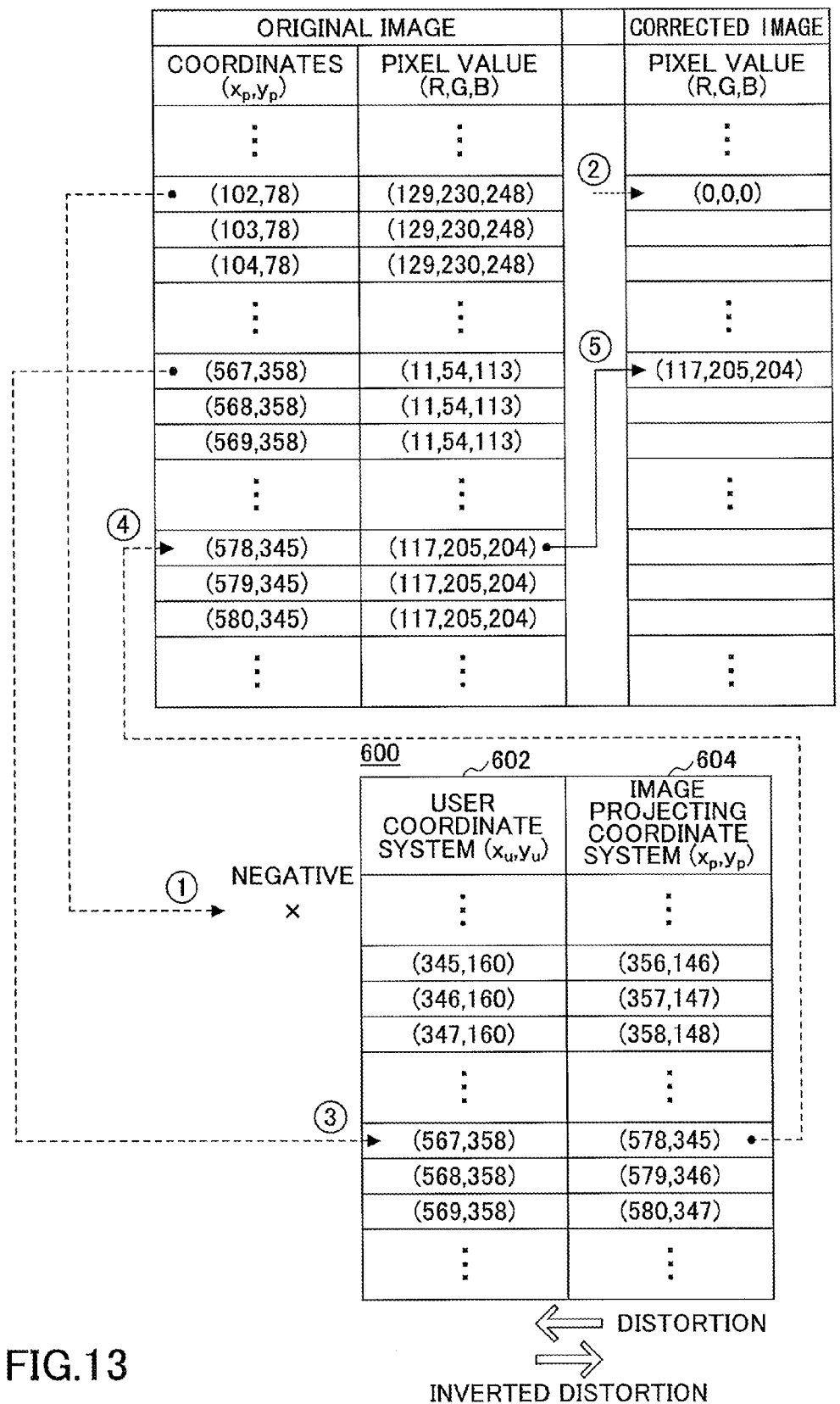
FIG. 13 is a schematic diagram illustrating a process for correcting the input image.

Hereinabove, a sequential process for creating the reference table 600 for correction is described. However, in order to minimize the distortion in the projection image, a distortion for offsetting the distortion expressed by the reference table needs to be given to the original image (image data). As for this, processes for correcting the original image (image data), by the image correcting unit 118 using the reference table 600, will be described, with reference to FIG. 13. FIG. 13 is a schematic diagram illustrating a process for correcting the input image.

The image correcting unit 118, responsive to input of the original image for projection, retrieves the reference table 600 from the storage unit 106. The image correcting unit 118 searches the field 602 in the reference table 600 with coordinates of the original image as the search keys. In a case where the search result of searching the field 602 is negative, a value (for example, RGB value) of a pixel corresponding to the search key (coordinates of the original image) is corrected into a value (0, 0, 0) of a black pixel. For example, in a case where the field 602 is searched with coordinates (102, 78) of the original image to find that the search result is none, an original value (129, 230, 248) of a pixel corresponding to the coordinates (102, 78) of the original image is corrected into a value (0, 0, 0) (see dotted arrows No. 1 and 2).

Meanwhile, in a case where the search result of searching the field 602 is positive, coordinates in the field 604 are retrieved associated with the found coordinates in the field 602. Then, a value of a pixel of the original image corresponding to the coordinates retrieved from the field 604 is obtained, thereby correcting the value of the pixel corresponding to the search key (coordinates of the original image) into the obtained value. For example, in a case where the field 602 is searched with coordinates (567, 358) as the search key to find coordinates in the field 602, coordinates (578, 345) stored in the field 604 associated with the coordinates (567, 358) are retrieved. Then, a value (117, 205, 204) of a pixel of the original image corresponding to the retrieved coordinates (578, 345) is obtained, thereby correcting the original value (11, 54, 113) of the pixel corresponding to the coordinates (567, 358) into the value (117, 205, 204) (see dotted arrows No. 3, 4 and 5).

The image correcting unit 118 generates a corrected image by performing the above processes on all of the pixels in the original image. Thus, the corrected image is equivalent to an image generated by performing inverse conversion of the distortion of the projection, which is detected by three-dimensional measurement, on the original image, and is projected on the projection surface by the image projecting device 200.

Figure 14A:
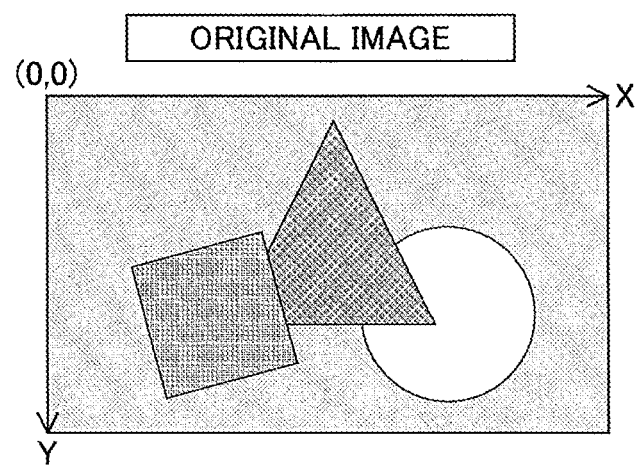
FIG. 14A is a diagram showing the original image.
Figure 14B:
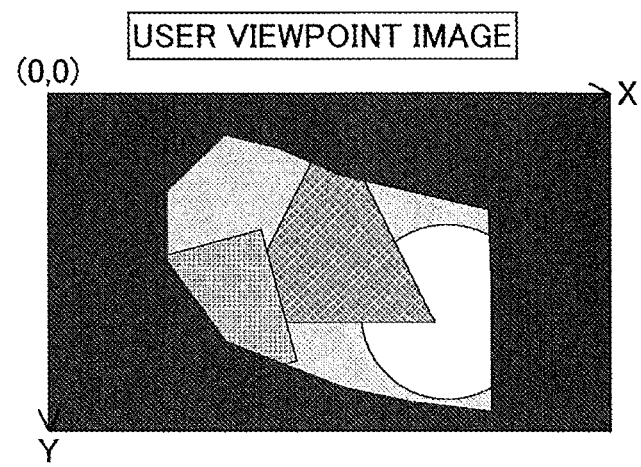
FIG. 14B is a diagram showing an image from the viewpoint of a user.

FIG. 14A is a diagram showing the original image. FIG. 14B is a diagram showing an image from the viewpoint of a user (hereinafter, referred to user viewpoint image), which is generated by projecting the corrected image of the original image on the projection surface 500. In the present embodiment, since the reference table for inverse conversion of the distortion of the projection is created based on three-dimensional measurement values with high reliability, the distortion of the projection is appropriately corrected, thereby generating the user viewpoint image in which the distortion is minimized.

Figure 15A:
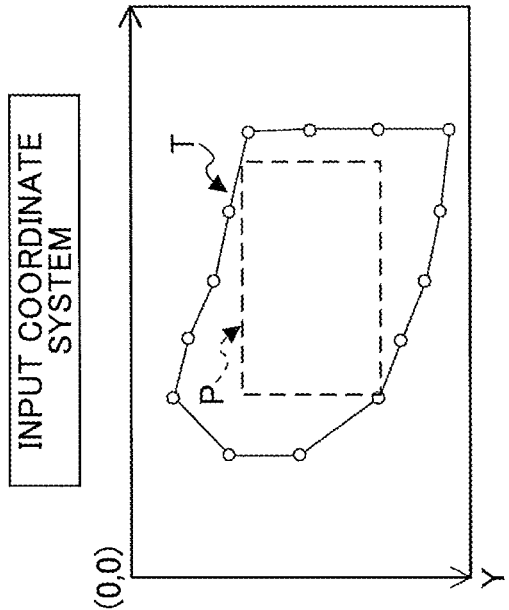
FIG. 15A is a schematic diagram illustrating processes for reducing the input image.
Figure 15B:
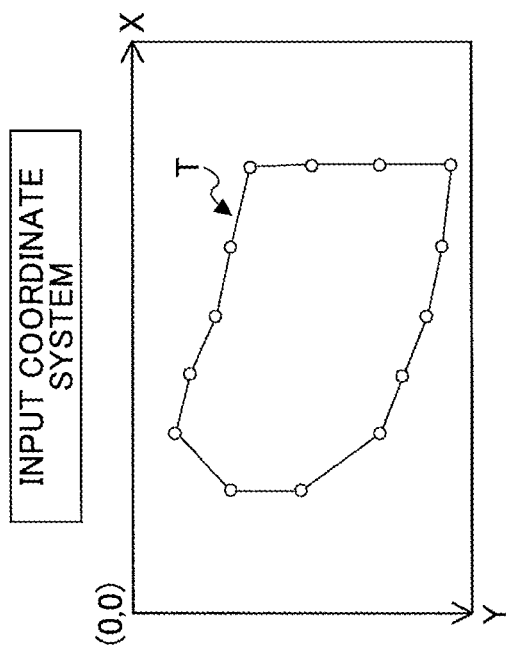
FIG. 15B is another schematic diagram illustrating processes for reducing the input image.

However, in the present embodiment, since the reference table 600 covers only the reliability area T, only a pixel area in the original image corresponding to the reliability area T is projected and the other pixel area is lost, as shown in FIG. 14B. Considering this, in a preferable embodiment, the image correcting unit 118 reduces a size of the original image into a size commensurate with the reliability area T, then corrects based on the reference table 600. As for this, a description will be given with respect to FIG. 15A and FIG. 15B. FIG. 15A is a schematic diagram illustrating processes for reducing the input image. FIG. 15B is another schematic diagram illustrating processes for reducing the input image.

In the preferable embodiment, the image correcting unit 118, before correcting based on the reference table 600, retrieves the reliability area T from the storage unit 106, and sets the reliability area on an input coordinate system, as shown in FIG. 15A. Further, the image correcting unit 118 searches to find a rectangular area having the same aspect ratio as that of the original image, where the rectangular area is included in (preferably having the maximum area) the reliability area T. The image correcting unit 118, as shown in FIG. 15B, sets the found rectangular area, as "projection area P" on the input coordinate system.

Then, the image correcting unit 118, after developing the original image on the input coordinate system responsive to the input of the original image, performs image processing in which the original image is reduced into a size included in the projection area P to be disposed within the projection area P. The image correcting unit 118 corrects the original image on which the image processing has been performed, using the reference table 600, thereby generating the corrected image.

Figure 16A:
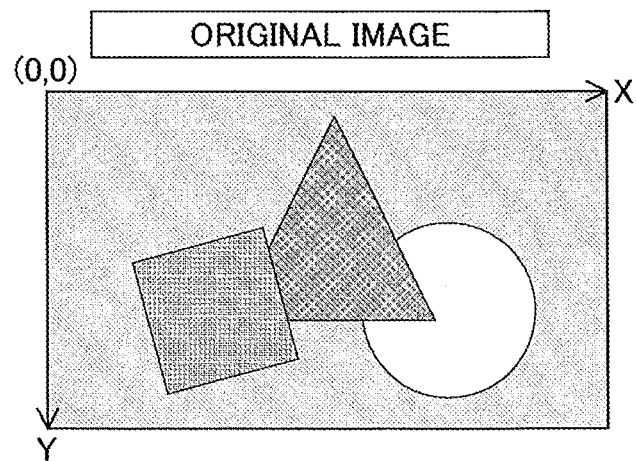
FIG. 16A is a diagram showing the original image.
Figure 16B:
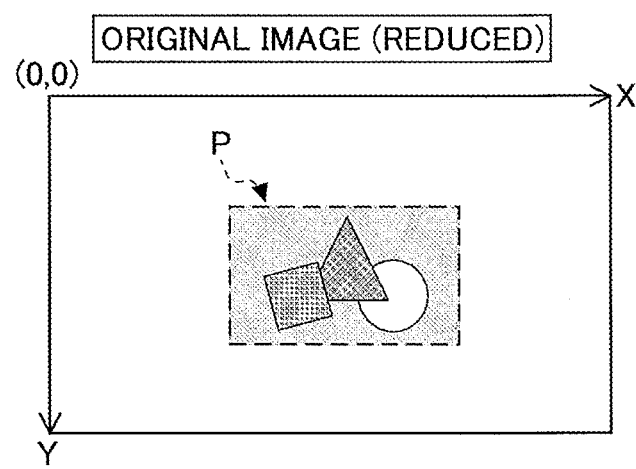
FIG. 16B is a diagram showing the reduced original image.
Figure 16C:
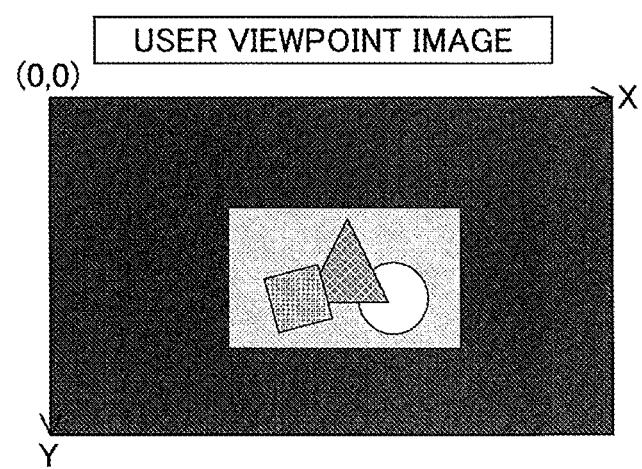
FIG. 16C is a diagram showing the user viewpoint image.

FIG. 16A is a diagram showing the original image. FIG. 16B is a diagram showing the reduced original image. FIG. 16C is a diagram showing the user viewpoint image. For example, the image correcting unit 118, responsive to the input of the original image as shown in FIG. 16A, performs the information processing to dispose the original image within the projection area P as shown in FIG. 16B. The image correcting unit 118 corrects the reduced original image shown in FIG. 16B, using the reference table 600, thereby generating the corrected image. The projecting unit 102 controls the image projecting device to project the generated corrected image on the projection surface 500. As shown in FIG. 16C, the user viewpoint image with minimized distortion without lost is obtained.

Additionally, in the present embodiment, the projection area P may be promptly searched to be found when the reliability area T is defined (in step S108), thereby creating the reference table in which the two-dimensional coordinates of the found projection area P are associated with the two-dimensional coordinates of the image projecting coordinate system.

Figure 17:
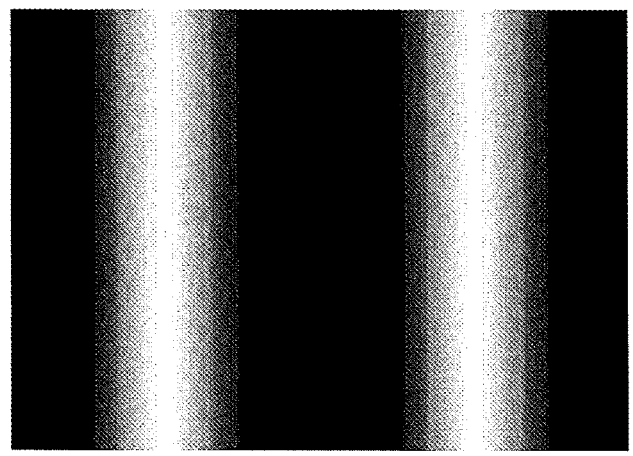
FIG. 17 is an illustration diagram of another example of the measurement patterns used in the present embodiment.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. For example, a combination of sine-wave patterns as shown in FIG. 17 may be used as the measurement pattern in the three-dimensional measurement described above, thereby specifying positions of the feature points based on phases of the sine-wave (phase shift method). FIG. 17 is an illustration diagram of another example of the measurement patterns used in the present embodiment. Also, projecting an infrared pattern as a measurement pattern on the projection screen, an image capturing device compatible with infrared rays may be used to capture the image of the projection surface.

Although, hereinabove, the embodiment is described, in which after performing the three-dimensional measurement using the projector and the camera, the corrected image is projected by the projector, after performing the three-dimensional measurement using other optical system, the corrected image may be projected by a projector whose relative position and direction, with respect to the other optical system, are known. Here, an infrared sensor, a stereo camera, a TOF (Time of Flight) distance measuring sensor, etc., are exemplified as the other optical systems for the three-dimensional measurement, and the generation of the corrected image can be achieved, similarly to the case as described above, where the reliability is defined based on at least one of the lens aberration and the detection errors of the feature points. Also, other modifications and alternative constructions, causing the same operations or effects, that may occur to one skilled in the art fall within the range of the present technology.

Further, functions of the embodiment described above can be achieved with computer-executable programs described in "C", "C++", "C#", "Java", or the like. The program of the present embodiment can be stored in a computer-readable recording medium, such as a hard disk drive, a CD-ROM, a MO, a DVD, a flexible disk, an EEPROM, or an EPROM, to be distributed, and be transmitted to other devices through a network in a form acceptable by the other devices.

The present application is based on Japanese Priority Application No. 2014-046340 filed on Mar. 10, 2014, the entire contents of which are hereby incorporated herein by reference.

What is claimed is:
1. A projection image correcting apparatus for correcting, according to a three-dimensional shape of a projection surface, an original image to be projected, comprising:
   memory storing computer-executable instructions; and
   one or more processors configured to execute the computer-executable instructions such that the one or more processors are configured to,
      project a pattern image on the projection surface, by controlling an image projecting device,
      obtain a captured image of the projection surface on which the pattern image is projected, by controlling an image capturing device,
      extract feature points in the captured image corresponding to feature points in the pattern image,
      measure, by triangulation using the extracted feature points, three-dimensional coordinates of a plurality of measuring points on the projection surface corresponding to the feature points,
      calculate reliabilities of the measuring points,
      convert the three dimensional coordinates of the measuring points into two-dimensional coordinates as defined in a view from a first viewpoint and define a reliability area including the converted measuring points that respectively have the reliabilities exceeding a certain threshold, create a reference table in which a distortion of a projection image viewed from the first viewpoint is expressed by association of the two-dimensional coordinates on the reliability area with two-dimensional coordinates on an image projecting coordinate system, correct the original image so that a distortion for offsetting the distortion expressed in the reference table is given to the original image, and find a projection area that is a rectangular area, having the same aspect ratio as that of the original image, included in the reliability area, and reduce the original image to be disposed within the projection area, before correcting the original image based on the reference table, wherein the reliabilities are defined based on at least one of lens aberration and detection errors of the feature points.

2. The projection image correcting apparatus as claimed in claim 1, wherein the one or more processors are configured to execute the computer-executable instructions such that the one or more processors are configured to correct a value of a first pixel of the original image into a value of black, in a case where two-dimensional coordinates of the reliability area corresponding to the first pixel have failed to be found in the reference table, and retrieve a value of a second pixel of the original image whose two-dimensional coordinates on an image projecting coordinate system are associated with the two-dimensional coordinates of the reliability area corresponding to the first pixel in the reference table, thereby correcting the value of the first pixel into the retrieved value of the second pixel, in a case where the two-dimensional coordinates of the reliability area corresponding to the first pixel are found in the reference table.

3. The projection image correcting apparatus as claimed in claim 1, wherein the one or more processors are configured to execute the computer-executable instructions such that the one or more processors are configured to calculate a reliability of the reliabilities defined based on the lens aberration by formula (1), $$\text{RELIABILITY}=1/d_c+1/d_p \qquad (1)$$

wherein "$d_c$" is a distance between the feature point and the center of the axis of the light beam of the captured image, and "$d_p$" is a distance between the feature point and the center of the axis of the light beam of the pattern image.

4. The projection image correcting apparatus as claimed in claim 1, wherein the one or more processors are configured to execute the computer-executable instructions such that the one or more processors are configured to, calculate a reliability of the reliabilities based on a distance between a line of projecting sight and a line of capturing sight in a case where the three-dimensional coordinates of the measuring point are measured by a midpoint method, and calculate the reliability based on a reprojection error in a case where the three-dimensional coordinates of the measuring point are measured by a method based on Reprojection Error Minimization.

5. A method for correcting, according to a three-dimensional shape of a projection surface, an original image to be projected, the method comprising: projecting a pattern image on the projection surface, by controlling an image projecting device;

obtaining a captured image of the projection surface on which the pattern image is projected, by controlling an image capturing device;

extracting feature points in the captured image corresponding to feature points in the pattern image;

measuring, by triangulation using the extracted feature points, three-dimensional coordinates of a plurality of measuring points on the projection surface corresponding to the feature points;

calculating reliabilities of the measuring points;

converting the three dimensional coordinates of the measuring points into two-dimensional coordinates as defined in a view from a first viewpoint and defining a reliability area including the converted measuring points that respectively have the reliabilities exceeding a certain threshold;

creating a reference table in which a distortion of a projection image viewed from the first viewpoint is expressed by association of the two-dimensional coordinates on the reliability area with two-dimensional coordinates on an image projecting coordinate system;

correcting the original image so that a distortion for offsetting the distortion expressed in the reference table is given to the original image; and finding a projection area that is a rectangular area, having the same aspect ratio as that of the original image, included in the reliability area, and reducing the original image to be disposed within the projection area, before correcting the original image based on the reference table, wherein the reliabilities are defined based on at least one of lens aberration and detection errors of the feature points.

6. The method as claimed in claim 5, wherein the correcting comprises:

correcting a value of a first pixel of the original image into a value of black, in a case where two-dimensional coordinates of the reliability area corresponding to the first pixel have failed to be found in the reference table, and retrieving a value of a second pixel of the original image, whose two-dimensional coordinates on an image projecting coordinate system are associated with the two-dimensional coordinates of the reliability area corresponding to the first pixel in the reference table, thereby correcting the value of the first pixel into the retrieved value of the second pixel, in a case where the two-dimensional coordinates of the reliability area corresponding to the first pixel are found in the reference table.

7. The method as claimed in claim 5, wherein in the calculating of the reliabilities, a reliability of the reliabilities is defined based on the lens aberration by formula (1), $$\text{RELIABILITY}=1/d_c+1/d_p \qquad (1)$$

wherein "$d_c$" is a distance between the feature point and the center of the axis of the light beam of the captured image, and "$d_p$" is a distance between the feature point and the center of the axis of the light beam of the pattern image.

8. The method as claimed in claim 5, wherein the calculating the reliabilities comprises:
    calculating a reliability of the reliabilities based on a distance between a line of projecting sight and a line of capturing sight in a case where the three-dimensional coordinates of the measuring point are measured by a midpoint method, and
    calculating the reliability based on a reprojection error in a case where the three-dimensional coordinates of the measuring point are measured by a method based on Reprojection Error Minimization.

9. A non-transitory computer-readable recording medium having stored therein a program for causing a computer to perform operations for correcting, according to a three-dimensional shape of a projection surface, an original image to be projected, the operations including:
    projecting a pattern image on the projection surface, by controlling an image projecting device;
    obtaining a captured image of the projection surface on which the pattern image is projected, by controlling an image capturing device;
    extracting feature points in the captured image corresponding to feature points in the pattern image;
    measuring, by triangulation using the extracted feature points, three-dimensional coordinates of a plurality of measuring points on the projection surface corresponding to the feature points;
    calculating reliabilities of the measuring points;
    converting the three dimensional coordinates of the measuring points into two-dimensional coordinates as defined in a view from a first viewpoint and defining a reliability area including the converted measuring points that respectively have the reliabilities exceeding a certain threshold;
    creating a reference table in which a distortion of a projection image viewed from the first viewpoint is expressed by association of the two-dimensional coordinates on the reliability area with two-dimensional coordinates on an image projecting coordinate system; and
    correcting the original image so that a distortion for offsetting the distortion expressed in the reference table is given to the original image, and
    finding a projection area that is a rectangular area, having the same aspect ratio as that of the original image, included in the reliability area, and reducing the original image to be disposed within the projection area, before correcting the original image based on the reference table,
    wherein the reliabilities are defined based on at least one of lens aberration and detection errors of the feature points.

* * * * *